United States Patent
Jun et al.

(10) Patent No.: US 8,064,402 B2
(45) Date of Patent: *Nov. 22, 2011

(54) APPARATUS AND METHOD FOR INTERWORKING WIRELESS LAN AND PORTABLE INTERNET

(75) Inventors: Sun-Mi Jun, Daejeon (KR); Kyung-Soo Kim, Daejeon (KR); Jee-Hwan Ahn, Daejeon (KR); Song-In Choi, Daejeon (KR); Dong-Soo Jung, Daejeon (KR); Byoung-Chun Jeon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 921 days.

This patent is subject to a terminal disclaimer.

(21) Appl. No.: 11/926,650

(22) Filed: Oct. 29, 2007

(65) Prior Publication Data

US 2008/0130576 A1 Jun. 5, 2008

(30) Foreign Application Priority Data

Dec. 1, 2006 (KR) .................. 10-2006-0120598
Apr. 11, 2007 (KR) .................. 10-2007-0035627

(51) Int. Cl.
*H04W 4/00* (2009.01)
(52) U.S. Cl. .................. 370/331; 370/338; 370/401
(58) Field of Classification Search .................. 370/350, 370/351, 469, 464, 329–339, 352–356, 401–427; 455/410, 435, 436–445
See application file for complete search history.

(56) References Cited

U.S. PATENT DOCUMENTS

| 7,539,175 | B2 * | 5/2009 | White et al. | 370/350 |
| 2004/0233930 | A1 * | 11/2004 | Colby, Jr. | 370/464 |
| 2005/0163078 | A1 * | 7/2005 | Oba et al. | 370/331 |
| 2005/0239438 | A1 * | 10/2005 | Naghian | 455/410 |
| 2006/0056448 | A1 * | 3/2006 | Zaki et al. | 370/466 |
| 2007/0021119 | A1 * | 1/2007 | Lee et al. | 455/436 |
| 2007/0070984 | A1 * | 3/2007 | Tseng | 370/352 |

FOREIGN PATENT DOCUMENTS

| KR | 2003-0071981 | 9/2003 |
| KR | 10-2006-0000830 | 1/2006 |
| KR | 10-2006-0097725 | 9/2006 |
| KR | 10-2006-0106976 | 10/2006 |
| KR | 10-2007-0076327 | 7/2007 |
| WO | 2005039114 | 4/2005 |

* cited by examiner

*Primary Examiner* — Pao Sinkantarakorn
*Assistant Examiner* — Iqbal Zaidi
(74) *Attorney, Agent, or Firm* — Kile Park Goekjian Reed & McManus PLLC (57) ABSTRACT

The present invention relates to a device for interworking a wireless local area network (WLAN) and a portable Internet. The device establishes a first wireless data path following a first wireless communication protocol with a first network, and establishes a plurality of the second wireless data paths through the first wireless data paths. Here, the plurality of the second wireless data paths follow a second wireless communication protocol and respectively correspond to a plurality of terminal devices. Subsequently, the device establishes a plurality of first network links respectively corresponding to the plurality of terminal devices with the first network, and stores mapping information for the first network link corresponding to a relationship between the plurality of terminal devices and the plurality of first network links.

13 Claims, 8 Drawing Sheets

APPARATUS AND METHOD FOR INTERWORKING WIRELESS LAN AND PORTABLE INTERNET

CROSS-REFERENCE TO RELATED APPLICATION

This application claims priority to and the benefit of Korean Patent Application No. 10-2006-0120598 filed in the Korean Intellectual Property Office on Dec. 1, 2006, and 10-2007-0035627 filed in the Korean Intellectual Property Office on Apr. 11, 2007, the entire contents of which are incorporated herein by reference.

BACKGROUND OF THE INVENTION (a) Field of the Invention

The present invention relates to an apparatus for interworking a wireless local area network (WLAN) and a portable Internet, and a method thereof. Particularly, the present invention relates to an apparatus for interworking a WLAN and a portable Internet so that a subscriber subscribing to a WLAN Internet service may receive an Internet service through the portable Internet, and a method thereof.

This work was supported by the IT R&D program of MIC/IITA[2006-S-009-01, The Development of WiBro Service and Operating Standard].

(b) Description of the Related Art

Conventional techniques for interworking a wireless local area network (WLAN) with networks including a wireless broadband Internet (WiBro), a universal mobile telecommunications system (UMTS), and a code division multiple access (CDMA) have been suggested. However, in the techniques, methods for connecting the WLAN and a public network through the above respective networks in a narrow area supporting the WLAN have been suggested or signal processes performed by WLAN terminals and the interworked network have been suggested.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for providing a service provided from a wireless local area network (WLAN) service provider to WLAN terminals through a portable Internet.

In an exemplary interworking method according to an embodiment of the present invention, a first wireless data path following a first wireless communication protocol is established with a first network, a plurality of second wireless data paths that respectively correspond to a plurality of terminal devices and follow a second wireless communication protocol are established through the first wireless data path, a plurality of first network links respectively corresponding to the plurality of terminal devices are established with the first network, and mapping information for the first network link that corresponds to a relationship between the plurality of terminal devices and the plurality of first network links is stored.

Here, the first wireless communication protocol supports a handover operation, and the second wireless communication protocol does not support a handover operation.

When the plurality of first network links are established, a bandwidth of each first network link is allocated according to a service grade of each terminal device.

When the mapping information is stored, the mapping information for the plurality of terminal devices respectively corresponding to the plurality of first network links is stored.

In the interworking method, a packet is received and the packet is transmitted according to the mapping information.

When the packet is transmitted, the packet is received through one among the plurality of first network links, and the packet is transmitted to the terminal device corresponding to the first network link among the plurality of terminal devices according to the mapping information.

The packet follows the first wireless communication protocol. When the packet is transmitted, the packet is received through one of the plurality of first networks, the packet is converted into a packet following the second wireless communication protocol, and the packet following the second wireless communication protocol is transmitted to the terminal device corresponding to the first network among the plurality of terminal devices according to the mapping information.

When the packet is transmitted, the packet is received through the second wireless data path from one terminal device among the plurality of terminal devices, and the packet is transmitted through the first network link corresponding to the terminal device among the plurality of first network links according to the mapping information.

The packet follows the second wireless communication protocol. When the packet is transmitted, the packet is received through the second wireless data path from one terminal device among the plurality of terminal devices, the packet is converted into a packet following the first wireless communication protocol, and the packet following the first wireless communication protocol is transmitted through the first network corresponding to the terminal device among the plurality of first network links according to the mapping information.

When the first wireless data path is established, a wireless link following the first wireless communication protocol is established with a base station of the first network, an authentication message is transmitted to an authentication server of the first network through the wireless link so that the authentication server of the first network performs an authentication process according to the authentication message, and the first wireless data path following the first wireless communication protocol is established with the first network when the authentication process is finished.

When the plurality of second wireless data paths are established, a wireless link following the second wireless communication protocol is established with each terminal device, an authentication message is received through the wireless link, the authentication message is transmitted to an authentication server of the second network through the first wireless data path so that the authentication server of the second network performs an authentication process according to the authentication message, and the second wireless data path following the second wireless communication protocol is established with the terminal device when the authentication process is finished.

In another exemplary interworking method according to an embodiment of the present invention, a first wireless data path following a first wireless communication protocol is established with a first network, an authentication message is received from a terminal device through the first wireless link, the authentication message is transmitted to an authentication server of a second network through the first data path to receive a service grade of the terminal device, and a first network link following the first wireless communication protocol is established according to the service grade of the terminal device.

In the interworking method, a second wireless data path following a second wireless communication protocol is established according to the service grade of the terminal device.

In the interworking method, data are received through the first network link and the data are transmitted through the second wireless data path.

In the interworking method, data are received through the second wireless data path, and the data are transmitted through the first network link.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise", and variations such as "comprises" and "comprising", will be understood to imply the inclusion of stated elements but not the exclusion of any other elements. The terms "module", "unit", and "block" used herein mean one unit that processes a specific function or operation, and may be implemented by hardware, software or a combination thereof.

An apparatus and method for interworking a wireless local area network (WLAN) and a portable Internet according to an exemplary embodiment of the present invention will be described with reference to the figures.

A configuration of a wireless Internet will be described with reference to FIG. 1.

Figure 1:
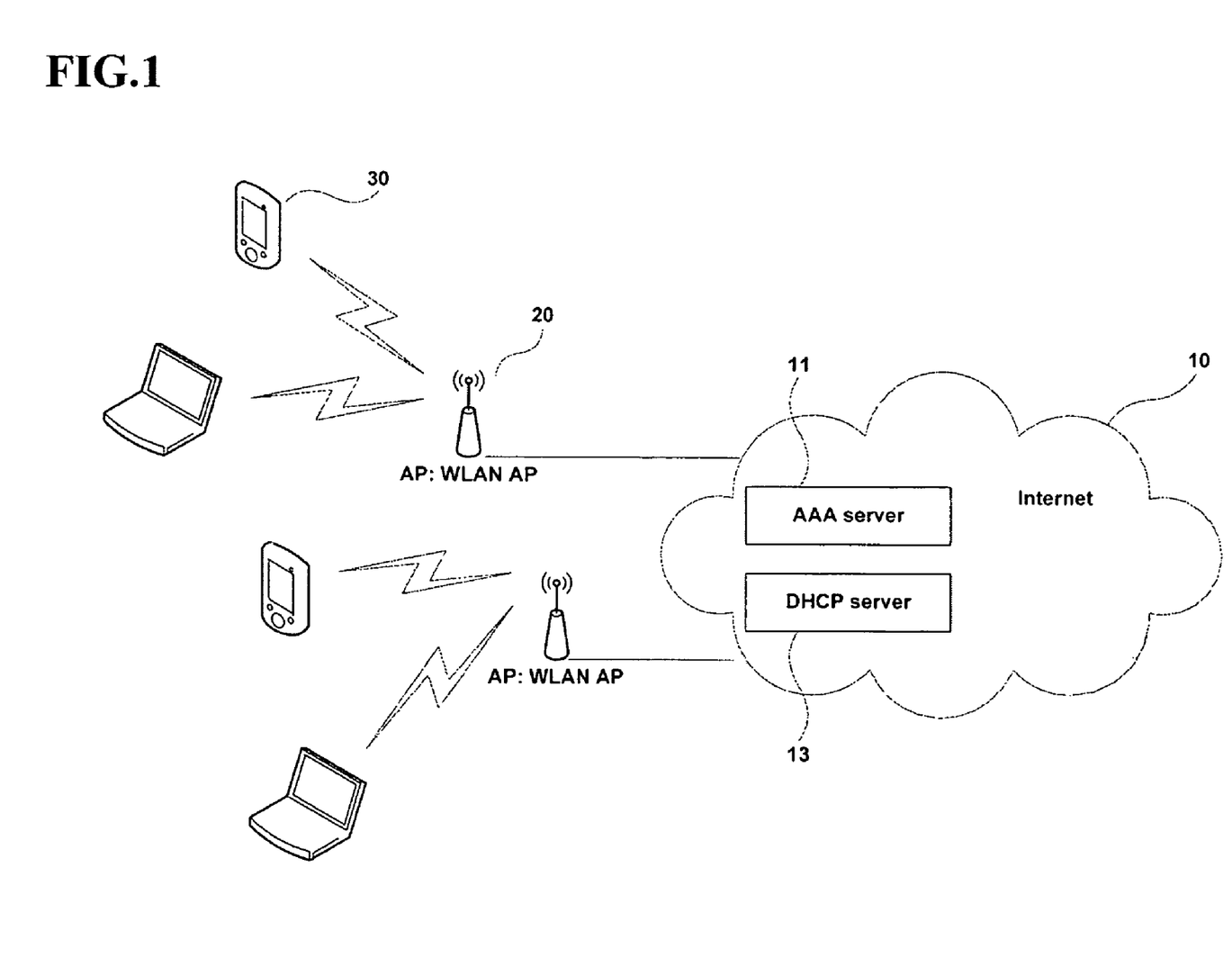
FIG. 1 is a schematic diagram of a wireless Internet.

FIG. 1 is a schematic diagram of the wireless Internet.

As shown in FIG. 1, the wireless Internet includes an Internet 10 and a WLAN access point (AP) 20, and communicates with a WLAN terminal 30 through a radio channel.

The Internet 10 is a wire-based Internet connected to the WLAN AP 20. The Internet 10 includes an authentication, authorization, and accounting (AAA) server 11 for authenticating the WLAN terminal 30, and a dynamic host configuration protocol (DHCP) server 13 for allocating an Internet protocol (IP) address to the authenticated WLAN terminal 30.

The WLAN AP 20 has an IP address of the AAA server 11 and a DHCP relay function to perform authentication and address allocation functions for all the WLAN terminals 30 accessed to the WLAN AP 20.

The WLAN terminal 30 accesses the WLAN AP 20 through a wireless link, and communicates with the WLAN AP 20 according to a WLAN communication standard.

A system including an interworking device for interworking the WLAN and the portable Internet according to the exemplary embodiment of the present invention will be described with reference to FIG. 2.

Figure 2:
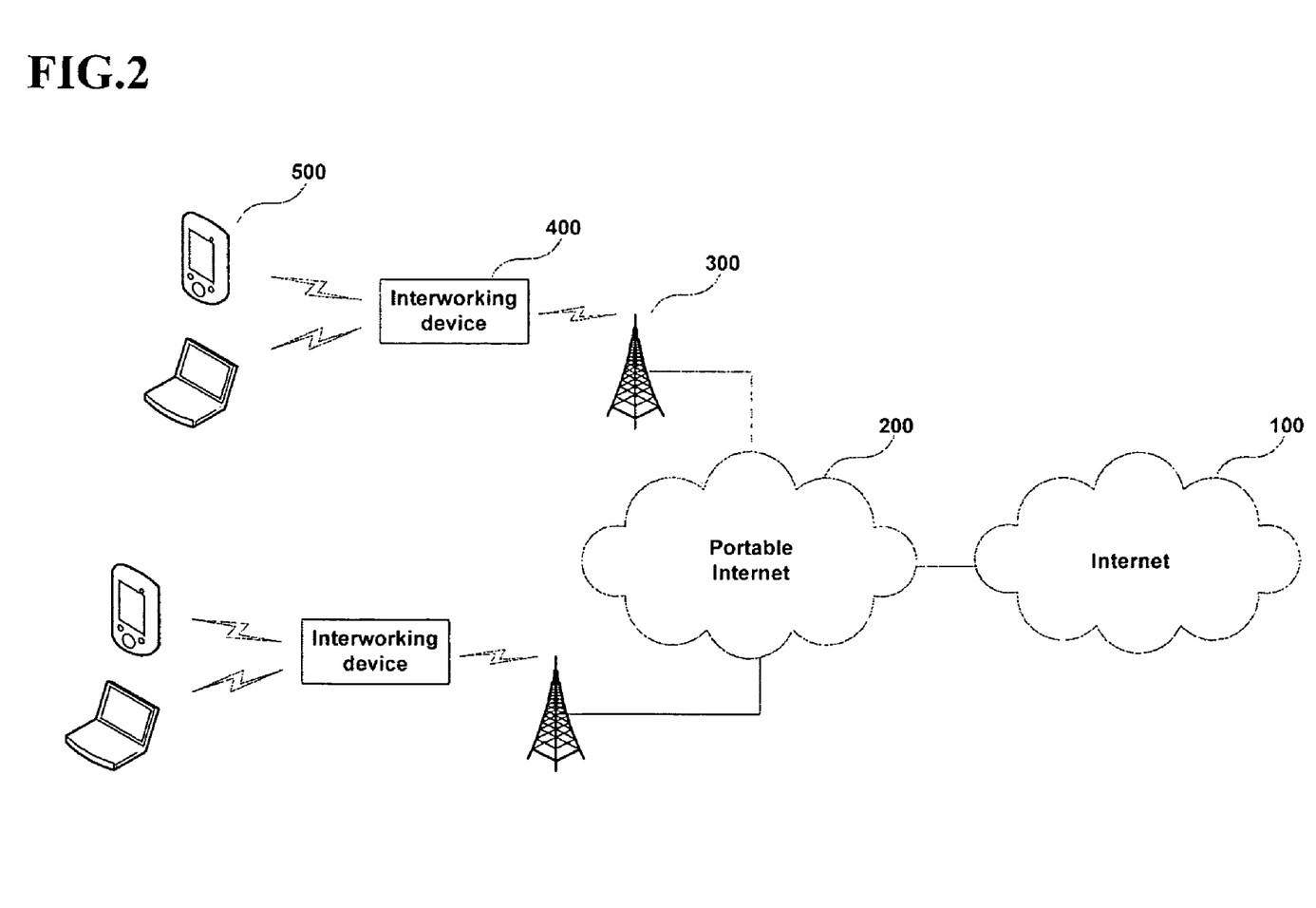
FIG. 2 is a diagram of a system for interworking a wireless local area network (WLAN) and a portable Internet according to an exemplary embodiment of the present invention.

FIG. 2 is a diagram of a system for interworking the WLAN and the portable Internet according to the exemplary embodiment of the present invention.

As shown in FIG. 2, the system including the interworking device includes an Internet 100, a portable Internet 200, a base station 300, and an interworking device 400, and communicates with a WLAN terminal 500 through the wireless link.

The Internet 100 is a wire-based Internet that provides an e-mail service, a telnet service, a file transfer protocol (FTP) service, a Gopher service, and a World Wide Web (WWW) service.

The portable Internet 200 communicates to the Internet 100 through a wired link, and provides a high speed wireless Internet service to a portable Internet terminal whether the portable Internet terminal stops or moves. The portable Internet 200 may be referred to as "wireless portable Internet", "wireless wideband Internet", "wireless high speed Internet", and "wireless broadband Internet (WiBro)"

The base station 300 transmits/receives a signal according to a control operation of the portable Internet 200 through a radio channel. The base station 300 has an own communication area, and may perform a handover operation with a neighboring base station 300.

The interworking device 400 communicates with the portable Internet 200 through the base station 300. In this case, the portable Internet 200 may acknowledge the interworking device 400 as a portable Internet terminal.

The WLAN terminal 500 communicates with the interworking device 400 through the wireless link. In this case, the WLAN terminal 500 may acknowledge the interworking device 400 as a WLAN AP.

The system including the interworking device for interworking the WLAN and the portable Internet according to the exemplary embodiment of the present invention will be described in further detail with reference to FIG. 3.

Figure 3:
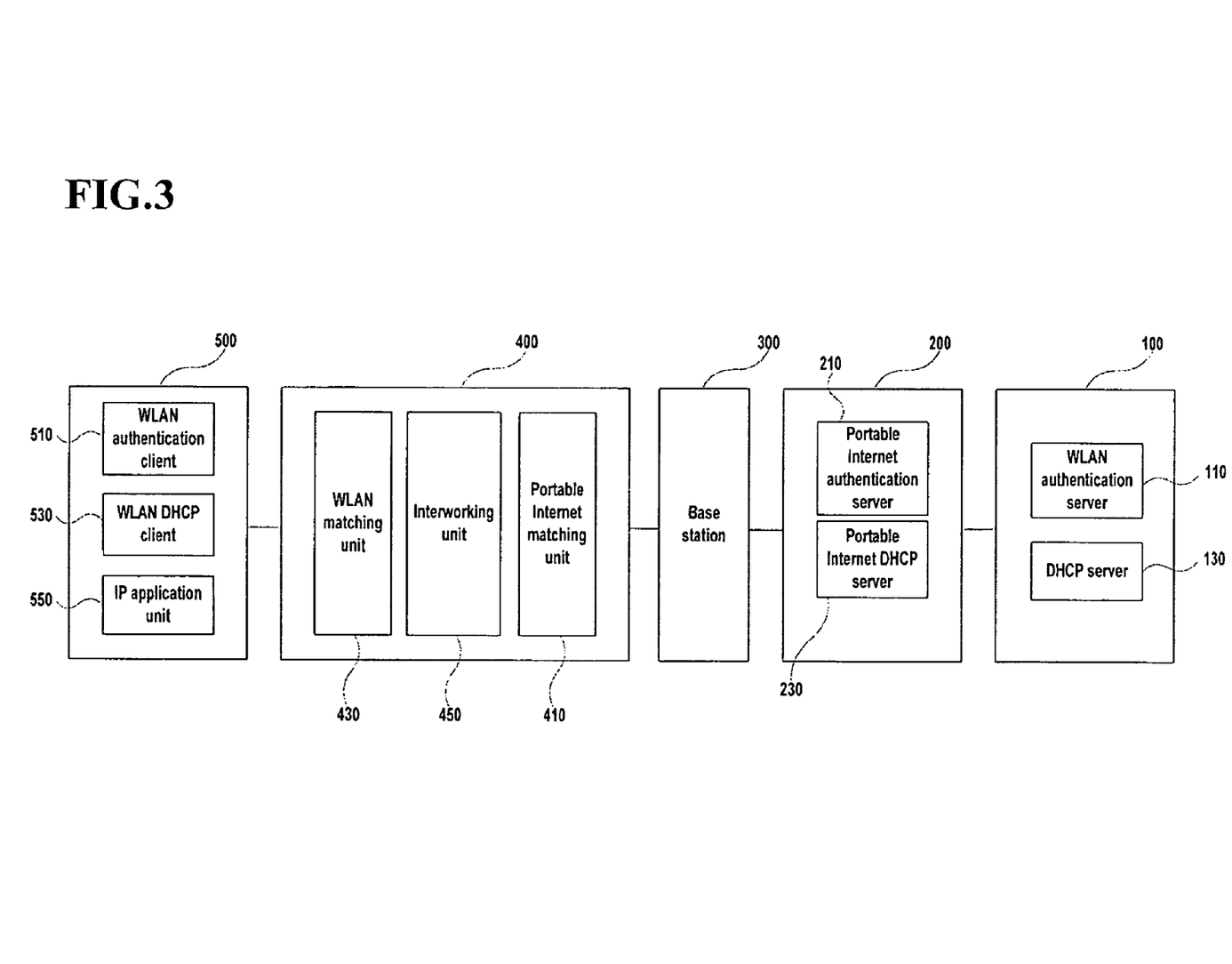
FIG. 3 is a schematic diagram of the system for interworking the WLAN and the portable Internet according to the exemplary embodiment of the present invention.

FIG. 3 is a schematic diagram of the system for interworking the WLAN and the portable Internet according to the exemplary embodiment of the present invention.

As shown in FIG. 3, the system for interworking the WLAN and the portable Internet includes the Internet 100, the portable Internet 200, the base station 300, and the interworking device 400, and communicates with the WLAN terminal 500.

The Internet 100 includes a WLAN authentication server 110 and a WLAN DHCP server 130. The WLAN authentication server 110 authenticates the WLAN terminal 500, and the WLAN DHCP server 130 allocates a network address for the WLAN terminal 500.

The portable Internet 200 includes a portable Internet authentication server 210 and a portable Internet DHCP server 230. The portable Internet authentication server 210 authenticates the portable Internet terminal, and the portable Internet DHCP server 230 allocates a network address for the portable Internet terminal.

The base station 300 has an own wireless communication area, and transmits/receives a signal to/from the portable Internet terminal within the wireless communication area according to a control operation of the portable Internet 200 through a radio channel. The base station 300 performs a handover operation with a neighboring base station when the portable Internet terminal moves into the wireless communication area of the neighboring base station 300.

The interworking device 400 includes a portable Internet matching unit 410, a WLAN matching unit 430, and an interworking unit 450. The portable Internet matching unit 410 accesses the portable Internet 200 and operates as the portable Internet terminal for the portable Internet 200. When the WLAN terminal 500 is accessed, the WLAN matching unit 430 operates as the WLAN AP for the WLAN terminal 500 and communicates with the WLAN terminal 500. The interworking unit 450 interworks the portable Internet matching unit 410 and the WLAN matching unit 430.

The WLAN terminal 500 includes a WLAN authentication client 510, a WLAN DHCP client 530, and an IP application unit 550. The WLAN authentication client 510 uses a WLAN authentication message to request a service provider to authenticate the WLAN terminal 500. The WLAN DHCP client 530 uses WLAN DHCP message to request the service provider to allocate the network address for the WLAN terminal 500. The IP application unit 550 transmits/receives a data packet.

The portable Internet matching unit of the interworking device according to the exemplary embodiment of the present invention will be described with reference to FIG. 4.

Figure 4:
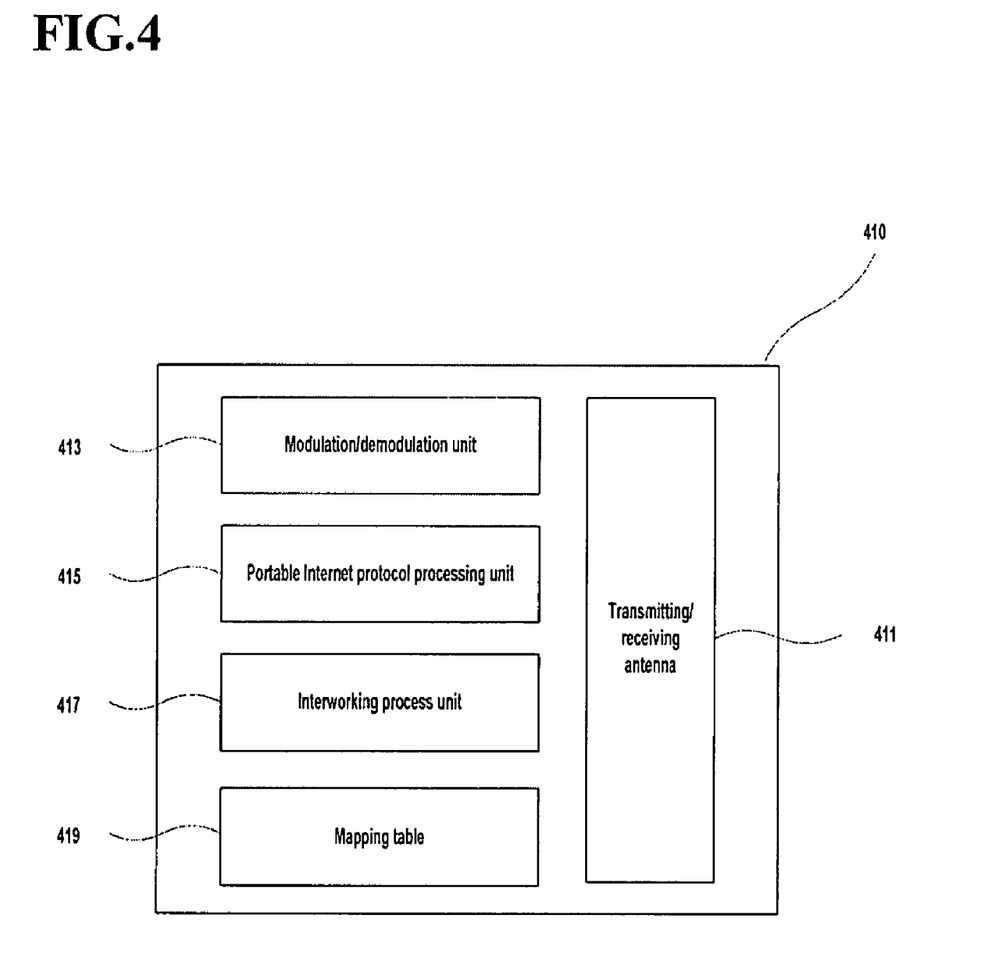
FIG. 4 is a schematic diagram of a portable Internet matching unit of an interworking device according to the exemplary embodiment of the present invention.

FIG. 4 is a schematic diagram of the portable Internet matching unit of the interworking device according to the exemplary embodiment of the present invention.

As shown in FIG. 4, the portable Internet matching unit 410 includes a transmitting/receiving antenna 411, a modulation/demodulation unit 413, a portable Internet protocol processing unit 415, an interworking processing unit 417, and a mapping table 419.

The transmitting/receiving antenna 411 transmits/receives a signal through the radio channel.

The modulation/demodulation unit 413 demodulates an analog signal received through the transmitting/receiving antenna 411 into a digital signal and modulates the digital signal into the analog signal to transmit the signal through the transmitting/receiving antenna 411.

The portable Internet protocol processing unit 415 processes the portable Internet protocol.

The interworking processing unit 417 interworks with the WLAN matching unit 430.

The mapping table 419 stores link information.

The WLAN matching unit of the interworking device according to the exemplary embodiment of the present invention will be described with reference to FIG. 5.

Figure 5:
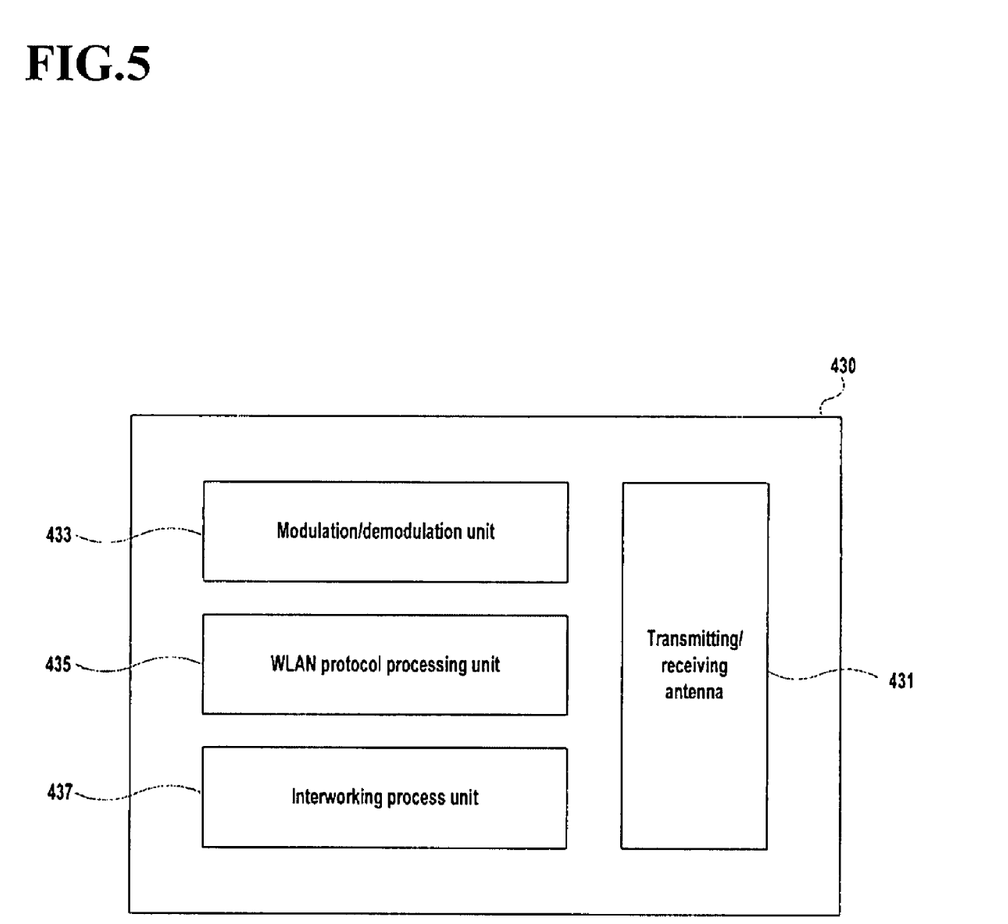
FIG. 5 is a schematic diagram of a WLAN matching unit according to the exemplary embodiment of the present invention.

FIG. 5 is a schematic diagram of the WLAN matching unit according to the exemplary embodiment of the present invention.

As shown in FIG. 5, the WLAN matching unit 430 includes a transmitting/receiving antenna 431, a modulation/demodulation unit 433, a WLAN protocol processing unit 435, and an interworking processing unit 437.

The transmitting/receiving antenna 431 transmits/receives a signal through the radio channel.

The modulation/demodulation unit 433 demodulates an analog signal received through the transmitting/receiving antenna 431 and modulates the digital signal to the analog signal to transmit the signal through the transmitting/receiving antenna 431.

The WLAN protocol processing unit 435 processes the WLAN protocol.

The interworking processing unit 437 interworks with the portable Internet matching unit 410.

The interworking unit of the interworking device according to the exemplary embodiment of the present invention will be described with reference to FIG. 6.

Figure 6:
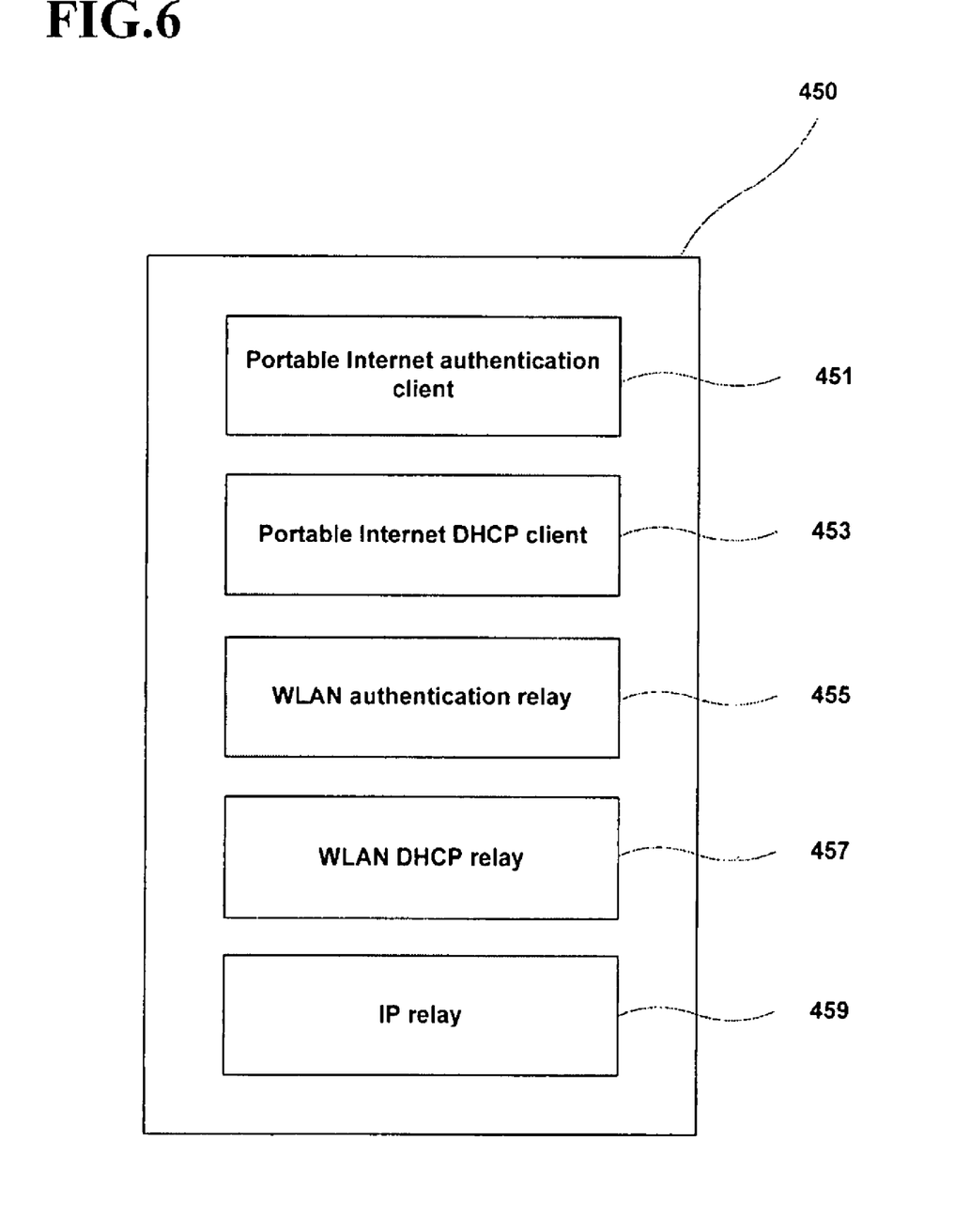
FIG. 6 is a schematic diagram of an interworking unit according to the exemplary embodiment of the present invention.

FIG. 6 is a schematic diagram of the interworking unit according to the exemplary embodiment of the present invention.

As shown in FIG. 6, the interworking unit 450 includes a portable Internet authentication client 451, a portable Internet DHCP client 453, a WLAN authentication relay 455, a WLAN DHCP relay 457, and an IP relay 459.

The portable Internet authentication client 451 requests the portable Internet 200 to authenticate the portable Internet matching unit 410 of the interworking device 400. In this case, the portable Internet authentication client 451 may use a portable Internet authentication message to request the portable Internet 200 to perform an authentication operation.

The portable Internet DHCP client 453 requests the portable Internet 200 to allocate a network address for the portable Internet matching unit 410 of the interworking device 400. In this case, the portable Internet DHCP client 453 may use a DHCP message to request the portable Internet 200 to allocate the network address.

The WLAN authentication relay 455 transmits the WLAN authentication message transmitted from the WLAN authentication client 510 to the portable Internet 200.

The WLAN DHCP relay 457 transmits the WLAN DHCP message transmitted from the WLAN DHCP client 530 to the portable Internet 200.

The IP relay 459 transmits the data packet transmitted by the IP application unit 550 to the portable Internet 200, and transmits the data packet transmitted by the portable Internet 200 to the IP application unit 550.

A signaling method of the system for interworking the WLAN and the portable Internet according to the exemplary embodiment of the present invention will be described with reference to FIG. 7.

Figure 7:
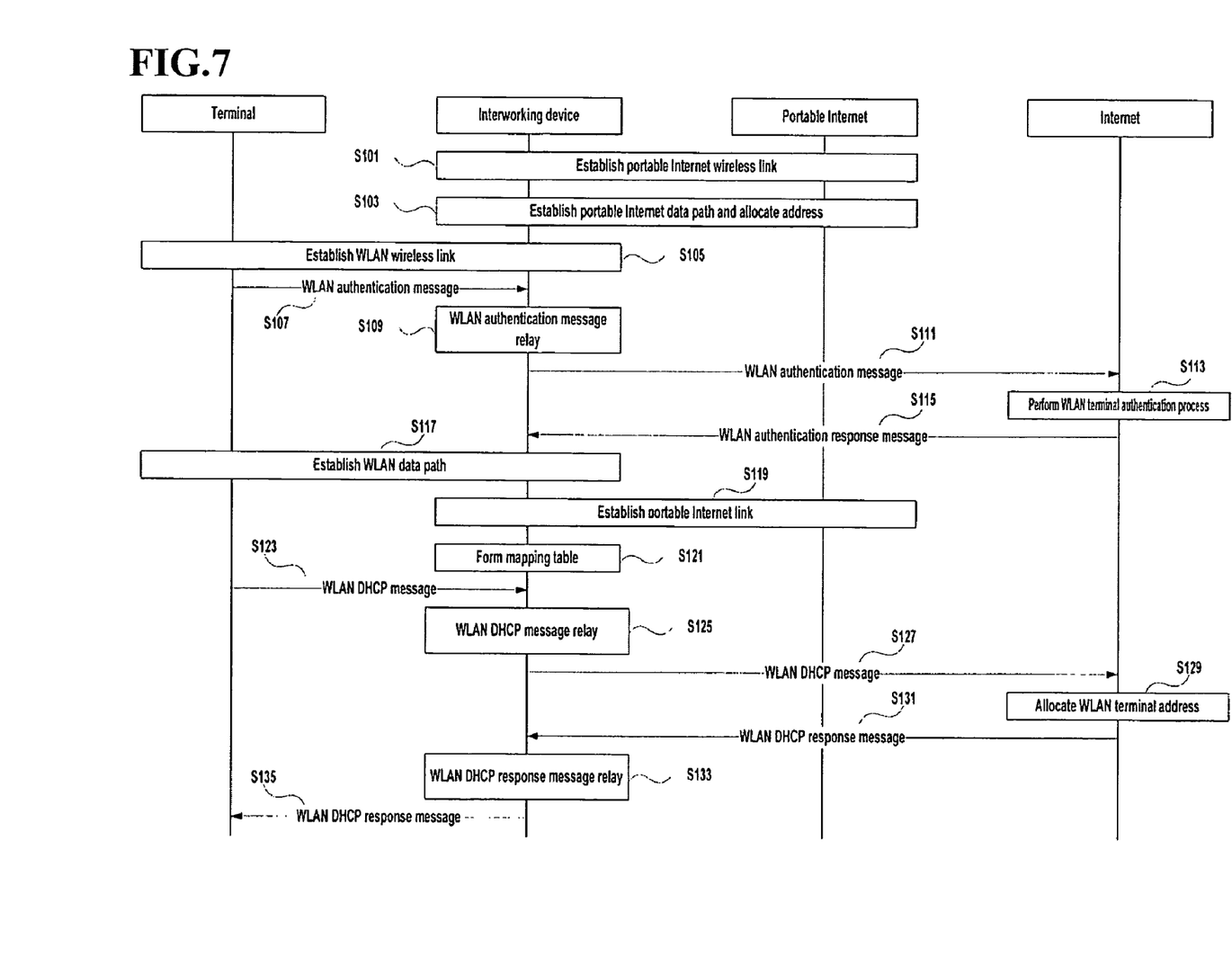
FIG. 7 is a flowchart representing a signaling method of the system for interworking the WLAN and the portable Internet according to the exemplary embodiment of the present invention.

FIG. 7 is a flowchart representing the signaling method of the system for interworking the WLAN and the portable Internet according to the exemplary embodiment of the present invention.

As shown in FIG. 7, the portable Internet matching unit 410 of the interworking device 400 establishes a portable Internet wireless link with the base station 300 of the portable Internet 200 in step S101. In this case, the portable Internet wireless link follows the portable Internet communication protocol defined by IEEE 802.16, and the portable Internet communication protocol supports a terminal handover operation.

The interworking device 400 establishes a portable Internet data path with the portable Internet 200 through the portable Internet wireless link, and the portable Internet 200 allocates a network address to the portable Internet matching unit 410 of the interworking device 400 in step S103. The portable Internet data path follows the portable Internet communication protocol defined by IEEE 802.16. The portable Internet authentication client 451 of the interworking unit 450 transmits the portable Internet authentication message to the portable Internet authentication server 210 of the portable Internet 200 through the portable Internet wireless link, and the interworking device 400 establishes the portable Internet data path with the portable Internet 200 according to the portable Internet authentication response message when the portable Internet authentication server 210 performs the authentication operation according to the portable Internet authentication message and transmits the portable Internet authentication response message. In addition, the portable Internet DHCP client 453 of the interworking unit 450 transmits the portable Internet DHCP message to the portable Internet DHCP server 230 through the portable Internet data path, and the portable Internet DHCP server 230 allocates the network address to the portable Internet matching unit 410 according to the portable Internet DHCP message.

The WLAN terminal 500 establishes a WLAN wireless link with the WLAN matching unit 430 of the interworking device 400 in step S105. The WLAN wireless link follows the WLAN communication protocol defined by IEEE 802.11, and the WLAN communication protocol does not support a handover operation.

The WLAN authentication client 510 of the WLAN terminal 500 transmits a WLAN authentication message to the WLAN matching unit 430 of the to interworking device 400 through the WLAN wireless link in step S107.

The WLAN authentication relay 455 of the interworking unit 450 performs a relay function in step S109 so that the WLAN authentication message is transmitted to the WLAN authentication server 110 of the Internet 100. In this case, the WLAN authentication relay 455 transmits the WLAN authentication message to the portable Internet matching unit 410 so that the WLAN authentication message is transmitted to the WLAN authentication server 110 of the Internet 100 through the portable Internet 200.

The portable Internet matching unit 410 of the interworking device 400 transmits the WLAN authentication message to the WLAN authentication server 110 of the Internet 100 through the portable Internet 200 in step S111. In this case, the interworking unit 450 may transmit the WLAN authentication message to the WLAN authentication server 110 through the portable Internet 200 in the portable Internet wireless link or the portable Internet data path.

The WLAN authentication server 110 of the Internet 100 performs the authentication process according to the WLAN authentication message in step S113. In this case, the authentication process performed by the WLAN authentication server 110 may vary according to characteristics of the Internet 100.

When the authentication process is finished, the WLAN authentication server 110 of the Internet 100 transmits a WLAN authentication response message to the interworking device 400 in response to the WLAN authentication message in step S115. The WLAN authentication response message includes service grade information for the WLAN terminal 500. In this case, the WLAN authentication server 110 may transmit the WLAN authentication response message to the interworking device 400 through the portable Internet 200 in the portable Internet wireless link or the portable Internet data path.

When the portable Internet matching unit 410 of the interworking device 400 receives the WLAN authentication response message, the interworking unit 450 of the interworking device 400 establishes a WLAN data path between the WLAN terminal 500 and the WLAN matching unit 430 of the interworking device 400 in step S117. The WLAN data path follows the WLAN communication protocol defined by IEEE 802.11. In this case, the interworking unit 450 may establish the WLAN data path according to the service grade information for the WLAN terminal 500.

The interworking unit 450 of the interworking device 400 establishes a portable Internet link between the portable Internet 200 and the portable Internet matching unit 410, and writes the portable Internet link information in the mapping table 419 of the portable Internet matching unit 410 in step S119. The portable Internet link follows the portable Internet communication protocol defined by IEEE 802.16. The interworking unit 450 may establish the portable Internet link by allocating a traffic parameter and a bandwidth of the portable Internet link based on the service grade information for the WLAN terminal 500. The portable Internet link corresponds to the WLAN data path for the WLAN terminal 500, and mapping information between the portable Internet link and the WLAN data path is stored in the mapping table 419 of the portable Internet matching unit 410.

When the portable Internet link is established to transmit IP traffic, the WLAN DHCP client 530 of the WLAN terminal 500 transmits the WLAN DHCP message to the WLAN matching unit 430 of the interworking device 400 through the WLAN data path in step S121. The WLAN DHCP message is used to request the network address for the WLAN terminal 500 from the WLAN DHCP server 130 of the Internet 100.

The WLAN DHCP relay 457 of the interworking unit 450 performs a relay function in step S123 so that the WLAN DHCP message is transmitted to the WLAN DHCP server 130 of the Internet 100. In this case, the WLAN DHCP relay 457 transmits the WLAN DHCP message to the portable Internet matching unit 410 so that the WLAN DHCP message is transmitted to the WLAN DHCP server 130 of the Internet 100 through the portable Internet 200.

The portable Internet matching unit 410 of the interworking device 400 transmits the WLAN DHCP message to the WLAN DHCP server 130 of the Internet 100 through the portable Internet 200 in step S121. In this case, the WLAN DHCP relay 457 of the interworking unit 450 may transmit the WLAN DHCP message to the WLAN DHCP server 130 of the Internet 100 through the portable Internet 200 in the portable Internet data path. In addition, the WLAN DHCP relay 457 may transmit the WLAN DHCP message to the WLAN DHCP server 130 through the portable Internet link, and in this case, the WLAN DHCP relay 457 may transmit the WLAN DHCP message through the portable Internet link corresponding to the WLAN terminal 500 by using the mapping table 419.

The WLAN DHCP server 130 of the Internet 100 allocates the network address of the WLAN terminal 500 according to the WLAN DHCP message in step S123. The WLAN DHCP server 130 may allocate the IP address corresponding to the network address.

The WLAN DHCP server 130 of the Internet 100 transmits a WLAN DHCP response message corresponding to the WLAN DHCP message to the interworking device 400 through the portable Internet 200 in step S125. In this case, the WLAN DHCP response message includes the network address of the WLAN terminal 500 allocated by the WLAN DHCP server 130.

When the WLAN DHCP response message is received through the portable Internet matching unit 410, the WLAN DHCP relay 457 of the interworking unit 450 performs the relay function in step S127 so that the WLAN DHCP response message is transmitted to the WLAN terminal 500.

In this case, the WLAN DHCP relay 457 transmits the WLAN DHCP response message to the WLAN matching unit 430 so that the WLAN DHCP response message is transmitted to the WLAN terminal 500 through the WLAN data path.

A data exchanging method of the system for interworking the WLAN and the portable Internet according to the exemplary embodiment of the present invention will be described with reference to FIG. 8.

Figure 8:
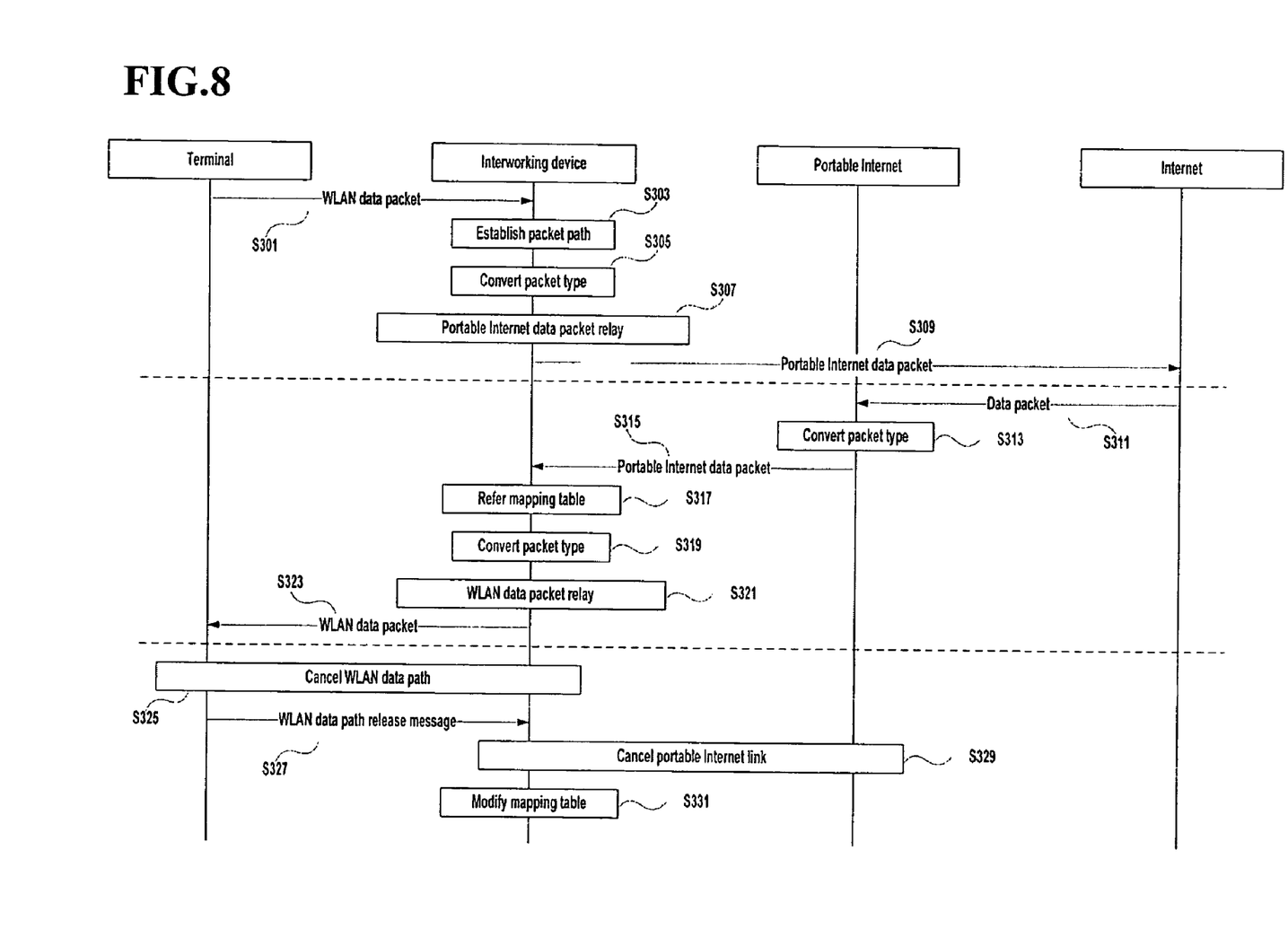
FIG. 8 is a flowchart representing a data exchanging method of the system for interworking the WLAN and the portable Internet according to the exemplary embodiment of the present invention.

FIG. 8 is a flowchart representing the data exchanging method of the system for interworking the WLAN and the portable Internet according to the exemplary embodiment of the present invention.

As shown in FIG. 8, when the data packet is transmitted to the Internet 100 of the WLAN terminal 500, the IP application unit 550 of the WLAN terminal 500 transmits a WLAN data packet following a WLAN standard to the WLAN matching unit 430 of the interworking device 400 through the WLAN data path in step S301. In this case, the WLAN data packet includes a data link address or a network address of the WLAN terminal 500.

The interworking device 400 uses the mapping table 419 of the portable Internet matching unit 410 to establish the portable Internet link allocated for the WLAN terminal 500 as a data packet path in step S303. The interworking device 400 searches the mapping table 419 based on the data link address or the network address of the WLAN terminal 500, and establishes the portable Internet link corresponding to the WLAN terminal 500 as the data packet path according to the mapping table 419.

The interworking device 400 converts a WLAN data packet type into a portable Internet type in step S305. The interworking device 400 converts the WLAN data packet into the portable Internet type so that the WLAN data packet passes through the portable Internet 200. The interworking processing unit 437 of the WLAN matching unit 430 and the interworking processing unit 417 of the portable Internet matching unit 410 are interworked to convert the WLAN data packet into a portable Internet data packet following the portable Internet standard.

In this case, when the IP relay 459 of the interworking unit 450 operates in a tunneling mode that provides a transparent data path from the interworking device 400 to the Internet 100, the interworking device 400 may capsulate the data packet.

In addition, when the IP relay 459 operates in a routing mode that determines a path, the interworking device 400 allows a header of the data packet to include the network address of the portable Internet 200 so that the data packet may be transmitted to the Internet 100 through the portable Internet 200.

Further, when the IP relay 459 operates in the routing mode, the interworking device 400 receives the network address of the WLAN matching unit 430 from the WLAN DHCP server 130 of the Internet 100, and receives the network address of the portable Internet matching unit 410 from the portable Internet DHCP server 230 of the portable Internet 200. The WLAN matching unit 430 and the portable Internet matching unit 410 respectively operate as routers, and the interworking device 400 has two interfaces.

The IP relay 459 of the interworking unit 450 performs the relay function in step S307 so that the portable Internet data packet is transmitted to the Internet 100. The IP relay 459 controls the portable Internet matching unit 410 to transmit the portable Internet data packet to the Internet 100 through the portable Internet 200.

The interworking device 400 transmits the portable Internet data packet to the Internet 100 in step S309. The portable Internet matching unit 410 maps the portable Internet data packet into the portable Internet link allocated for the WLAN terminal 500 so that the portable Internet data packet is transmitted to the Internet 100 through the portable Internet 200 in the portable Internet link. Since it receives the portable Internet data packet, the Internet 100 receives the WLAN data packet transmitted from the WLAN terminal 500.

When the Internet 100 transmits the data packet to the WLAN terminal 500, the Internet 100 transmits the data packet to the portable Internet 200 in step S311. In this case, the data packet includes the data link address or the network address of the WLAN terminal 500 that corresponds to a destination.

The portable Internet 200 converts a type of the data packet in step S313. The portable Internet 200 generates the portable Internet data packet following the portable Internet standard by converting the type of the data packet to transmit the data packet through the portable Internet link.

The portable Internet 200 transmits the portable Internet data packet to the portable Internet matching unit 410 of the interworking device 400 through the portable Internet link in step S315. The portable Internet 200 transmits the portable Internet data packet through the portable Internet link allocated for the WLAN terminal 500 corresponding to a destination of the data packet. In this case, the portable Internet 200 may include information of the WLAN terminal 500 and the portable Internet link.

The interworking device 400 uses the mapping table of the portable Internet matching unit 410 to the map WLAN terminal 500 corresponding to the portable Internet link to which the portable Internet data packet is transmitted in step S317.

The interworking device 400 converts a type of the portable Internet data packet into a type of the WLAN terminal in step S319. The interworking device 400 converts the portable Internet data packet into the WLAN type so that the portable Internet data packet is transmitted to the WLAN terminal 500 through the WLAN data path. The interworking processing unit 417 of the portable Internet matching unit 410 and the interworking processing unit 437 of the WLAN matching unit 430 are interworked to convert the portable Internet data packet into the WLAN data packet following the WLAN standard.

The IP relay 459 of the interworking unit 450 performs the relay function in step S321 so that the WLAN data packet is transmitted to the WLAN terminal 500. The IP relay 459 controls the WLAN matching unit 430 to transmit the WLAN data packet to the WLAN terminal 500 through the WLAN data path.

In step S323 the interworking device 400 transmits the WLAN data packet to the WLAN terminal 500. The WLAN matching unit 430 transmits the WLAN data packet to the WLAN terminal 500 corresponding to the portable Internet link. Since it receives the WLAN data packet, the WLAN terminal 500 receives the data packet transmitted from the Internet 100.

When the WLAN terminal 500 cancels the access, the WLAN terminal 500 releases the WLAN data path in step S325, and transmits a WLAN data path release message to the interworking device 400 through the WLAN wireless link in step S327.

In step S329, the interworking device 400 releases the portable Internet link allocated for the WLAN terminal 500 according to the WLAN data path release message.

Subsequently, the interworking device 400 modifies the mapping table 419 in step S331. The portable Internet matching unit 410 deletes the mapping information for the WLAN terminal 500 canceling the access from the mapping table 419.

In the exemplary embodiment of the present invention, the WLAN and the portable Internet are interworked, but it is not limited thereto. In addition, in another exemplary embodiment of the present invention, a network for supporting a handover and a network that does not support a handover may be interworked.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As described above, according to the exemplary embodiment of the present invention, the WLAN terminal may receive a WLAN service by accessing the WLAN AP without any changes, and it may receive an Internet service in a moving state by using mobility of the portable Internet.

What is claimed is:

1. An interworking method comprising: establishing a first wireless data path following a first wireless communication protocol between an interworking device and a first network;
   establishing a plurality of second wireless data paths between the interworking device and a plurality of terminal devices, wherein the plurality of second wireless data paths respectively correspond to the plurality of terminal devices and follow a second wireless communication protocol;
   establishing a plurality of first network links between the interworking device and the first network through the first wireless data path, wherein the plurality of first network links respectively correspond to the plurality of terminal devices;
   storing mapping information for the plurality of first network links that corresponds to relationships between the plurality of terminal devices and the plurality of first network links;
   receiving a message from a first terminal device of the plurality of terminal devices through one of the plurality of second wireless data paths; and transmitting to the first network the message received from the first terminal device through a corresponding one of the plurality of first network links corresponding to the first terminal device based on the stored mapping information, wherein the first wireless communication protocol supports a handover operation, and the second wireless communication protocol does not support a handover operation.

2. The interworking method of claim 1, wherein the establishing of the plurality of first network links comprises allocating a bandwidth of each first network link according to a service grade of each terminal device.

3. The interworking method of claim 2, wherein the storing of the mapping information comprises storing the mapping information for the plurality of terminal devices respectively corresponding to the plurality of first network links.

4. The interworking method of claim 3, further comprising receiving a packet and transmitting the packet according to the mapping information.

5. The interworking method of claim 4, wherein the transmitting of the packet comprises receiving the packet through one among the plurality of first network links; and
   transmitting the packet to the terminal device corresponding to the first network link among the plurality of terminal devices according to the mapping information.

6. The interworking method of claim 5, wherein the packet follows the first wireless communication protocol, and the transmitting of the packet comprises receiving the packet through one of the plurality of first networks;
   converting the packet into a packet following the second wireless communication protocol; and transmitting the packet following the second wireless communication protocol to the terminal device corresponding to the first network among the plurality of terminal devices according to the mapping information.

7. The interworking method of claim 4, wherein the transmitting of the packet comprises receiving the packet through the second wireless data path from one terminal device among the plurality of terminal devices; and transmitting the packet through the first network link corresponding to the terminal device among the plurality of first network links according to the mapping information.

8. The interworking method of claim 7, wherein the packet follows the second wireless communication protocol, and the transmitting of the packet comprises receiving the packet through the second wireless data path from one terminal device among the plurality of terminal devices;
   converting the packet to a packet following the first wireless communication protocol; and
   transmitting the packet following the first wireless communication protocol through the first network corresponding to the terminal device among the plurality of first network links according to the mapping information.

9. The interworking method of claim 3, wherein the establishing of the first wireless data path comprises establishing a wireless link following the first wireless communication protocol with a base station of the first network;
   transmitting an authentication message to an authentication server of the first network through the wireless link so that the authentication server of the first network performs an authentication process according to the authentication message; and
   establishing the first wireless data path following the first wireless communication protocol with the first network when the authentication process is finished.

10. The interworking method of claim 3, wherein the establishing of the plurality of second wireless data paths comprises:
   establishing a wireless link following the second wireless communication protocol with each terminal device;
   receiving an authentication message through the wireless link;
   transmitting the authentication message to an authentication server of the second network through the first wireless data path so that the authentication server of the second network performs an authentication process according to the authentication message; and
   establishing the second wireless data path following the second wireless communication protocol with the terminal device when the authentication process is finished.

11. An interworking method comprising: establishing a first wireless data path following a first wireless communication protocol with a first network;
  establishing a first wireless link following a second wireless communication protocol with a terminal;
  receiving an authentication message from the terminal device through the first wireless link;
  transmitting the authentication message to an authentication server of a second network through the first data path;
  receiving a service grade of the terminal device from the authentication server of the second network through the first data path in response to the transmitting the authentication message; and establishing a first network link following the first wireless communication protocol according to the service grade of the terminal device;
  establishing a second wireless data path following a second wireless communication protocol according to the service grade of the terminal device, wherein the first wireless communication protocol supports a handover operation, and the second wireless communication protocol does not support a handover operation.

12. The interworking method of claim 11, further comprising receiving data through the first network link and transmitting the data through the second wireless data path.

13. The interworking method of claim 11, further comprising receiving data through the second wireless data path, and transmitting the data through the first network link.

* * * * *